Nov. 26, 1957 G. M. BEATTY 2,814,514
PIPE COUPLING
Filed Nov. 28, 1955
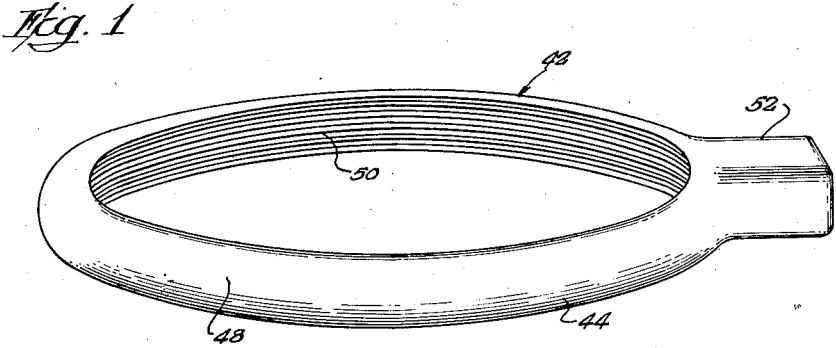
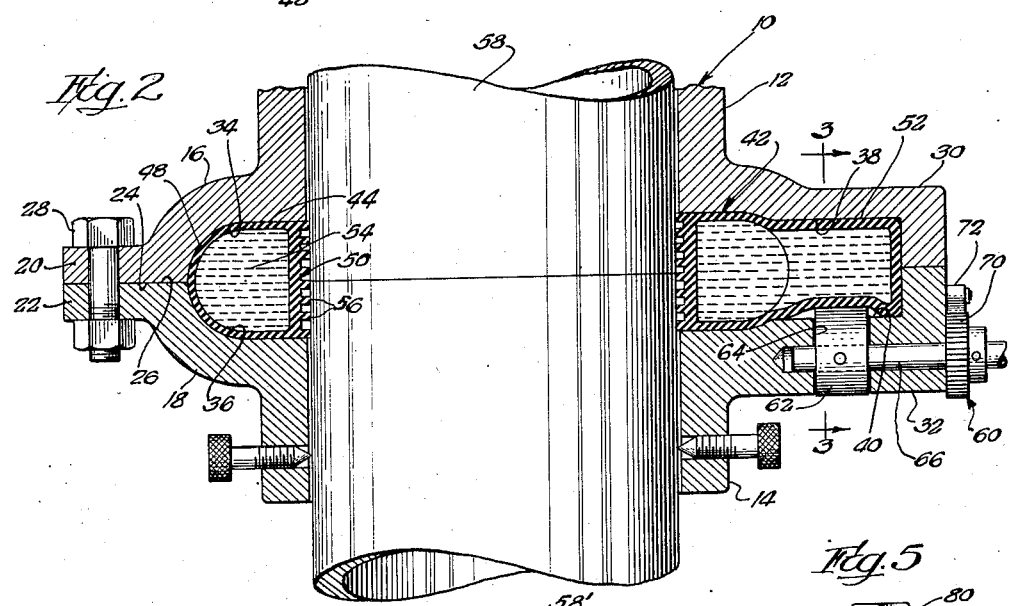
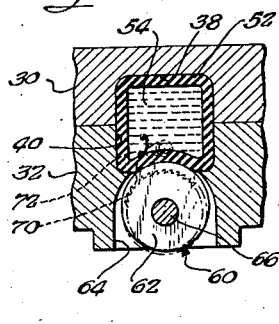
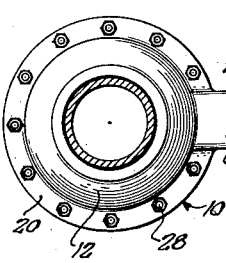
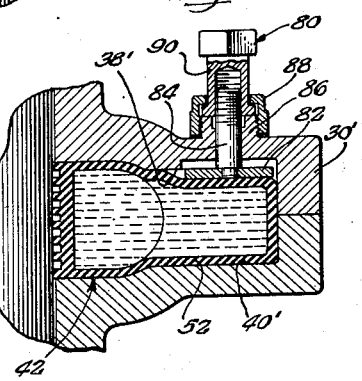
INVENTOR.
GUY M. BEATTY
BY
ATTORNEY.

ical compression stresses set up in the material of the ring, by direct compression of the latter, tend to produce points of increased sealing pressure of the ring against the pipe with a resultant lack in uniformity of the sealing pressure which is undesirable in most installations, and also, the radial thrust of the compression means on the ring tends to radially offset the latter so that generally three or more equiangularly spaced compression means are necessary to maintain concentricity of the seal ring and the coupling. Such multiplicity of compression means, of course, results in an unduly complex and costly structure. The compression means in these prior couplings, also, have generally comprised a threaded screw, or the like, which was prone to gumming up by the oil and tar products present, for example, in oil well pipe installations so that the compression means had to be frequently cleaned and replaced.

The present invention has as its primary object the provision of a fluid-tight pipe coupling, incorporating a sealed fluid-filled seal ring, which avoids the above-noted and other deficiencies of existing couplings of this type.

Another object of the invention is the provision of a fluid-tight pipe coupling of the character described wherein the fluid-filled seal ring is provided with a reservoir portion which is compressed to pressurize the fluid in the ring so as to eliminate the non-uniform sealing pressures arising from compression of the ring itself.

Yet another object of the invention is the provision of a fluid-tight coupling of the character described which is not prone to radial displacement out of concentricity wth the coupling under the action of the forces developed by the ring compressing means.

A further object of the invention is the provision of a fluid-tight pipe coupling of the character described wherein concentricity of the seal ring and pipe coupling and uniformity in the sealing pressures throughout a complete 360° of the ring are maintained by the provision of a laterally extending reservoir portion on the ring which is compressed, to pressurize a quantity of fluid sealed within the ring, by compression means which exert a thrust on the reservoir in a direction paralleling the axis of the ring.

A better understanding of the invention may be had from the following detailed description thereof taken in conjunction with the annexed drawings, wherein:

Fig. 1 is an enlarged perspective view of the seal ring embodied in the present coupling;

Fig. 2 is a section taken longitudinally through the present coupling;

Fig. 3 is a section taken along line 3—3 of Fig. 2;

Fig. 4 is a plan view on reduced scale of the present coupling; and

Fig. 5 is a view in section illustrating a modified form of the invention.

Referring now to these drawings, the fluid-tight pipe coupling of this invention comprises a housing 10 of generally cylindrical sleeve-like configuration and which is divided into two separable sleeve sections 12 and 14 along a transverse plane intermediate the ends of the housing. The adjacent end portions of the sleeve sections 12 and 14 are radially enlarged, as indicated at 16 and 18, and formed with annular flanges 20 and 22 having end faces 24 and 26 in said aforementioned transverse plane. The two sleeve sections 12 and 14 are rigidly secured together in any suitable manner, as by bolts 28 extending to the flanges at circumferentially spaced points therealong.

At one point along the circumference of the housing, the two sleeve sections 12 and 14 are formed with alined, radial extensions 30 and 32 positioned in face abutting relationship. Adjacent ends of the sleeve sections 12 and 14 are formed with an annular recess 34 and 36 respectively which, when the two sleeve sections are rigidly assembled in the manner illustrated, together form in the housing 10 an internal groove or channel of generally semi-circular cross sectional configuration. Extensions 30 and 32 are similarly formed with opposing, generally rectangular recesses 38 and 40 which, in the assembled condition of the parts, define a chamber communicating with the annular channel 34, 36.

The seal ring 42 of this invention comprises a hollow, annular tube 44 of flexible material having a generally semi-circular radially outer surface 48 and a generally cylindrical, grooved, inner surface 50 coaxial with the tube 44. At one point about its circumference, tube 44 is formed with a lateral, hollow extension 52 the interior of which communicates with the interior of the tube 44.

In the assembled position of the seal ring 42 in the housing 10, the annular tube 44 of the ring is disposed in the inner, annular channel 34, 36 with the lateral extension 52 of the ring extending into the chamber 38, 40. The hollow interior of the tube 44 and extension 52 are filled with a fluid 54, which preferably is a liquid fluid. In the normal condition of the ring, the fluid 54 is under substantially no pressure and completely fills the hollow ring interior, while the lands 56 defined by the grooves in the cylindrical inner surface 50 of the ring are substantially coplanar with the inner cylindrical walls of the sleeve sections 12, 14 so that the ends of a pair of pipes 58 and 58' may be readily inserted into the coupling to a position wherein seal ring 42 overlies the ends of the pipes. In the normal, unpressurized condition of the seal ring 42, therefore, the inner wall 50 thereof will be radially outwardly spaced slightly from the pipes 58 and 58'.

To provide for the radially inward contraction of the seal ring into sealing engagement with the pipes, there are provided compression means, generally indicated at 60 in Figs. 2 and 3 for compressing the lateral extension 52 on the seal ring 42 so as to pressurize the fluid 54 in the latter and cause said inward contraction of the ring into sealing engagement with the pipes.

The preferred form of compression means for use in the instant coupling, illustrated in Figs. 2 and 3, comprises an eccentric disk 62 which is rotatably positioned in a slot 64 in the sleeve extensions 32 with its axis of rotation disposed in a plane normal to the axis of the coupling. Eccentric disk 62 is rigidly fixed on one end of an operating shaft 66, journaled in said extension 32 and projecting exteriorly of the coupling. The outer end of this shaft is squared for receipt in the squared opening of an operating handle whereby the shaft 66, and therefore the eccentric disk 62, may be rotated. The positioning of the disk 62 in the extension 32 is such that with its portion of minimum eccentricity engaging the seal ring extension 52, the latter will be substantially uncompressed so that by rotation of the disk, said extension 52 may be compressed by varying amounts to increase the pressure of the fluid in the seal ring to a maximum value corresponding to that existing when the maximum throw of the disk is engaged with the seal ring extension, the position shown in Figs. 2 and 3.

To enable the eccentric disk 62 to be locked in a given angular position, so as to permit a desired amount of pressurization of fluid in the seal ring, and therefore a desired sealing pressure of the ring with the pipes 58 and 58', the operating shaft 66 rigidly mounts a ratchet 70 which operatively engages a pawl 72 pivotally mounted on the extension 32 of the housing which ratchet and pawl will cooperate to lock the shaft, and therefore the eccentric disk 62 in a desired angular position. The above-described ratchet and pawl arrangement for locking the disk in the desired position so as to maintain a desired pressure in the seal ring, is advantageous in oil pipe line installations since such an arrangement is devoid of any threaded connections which are quickly rendered inoperative, as previously mentioned, by the oils and tars present in such installations.

Where such conditions are not present, however, the modified form of compression means 80 of Fig. 5, may be employed in lieu of the eccentric disk arrangement of Fig. 2. This modified compression means 80 comprises a rectangular pressure plate 82 within the chamber 38', 40' which corresponds to the chamber 38, 40 in Fig. 2. This plate 82 is rigidly fixed to one end of a clamp screw 84 axially slidable in coupling housing extension 30' corresponding to extension 30 in Fig. 2. This extension 30' is formed with a threaded boss 86 on which is threaded a flanged retaining sleeve 88. A flanged, internally threaded adjusting sleeve 90, having a squared wrench-engaging head, is threaded on screw 84 with the flange of the adjusting sleeve abutting the under side of the flange on the retaining sleeve 88. It will be seen that by rotation of the adjusting sleeve 90, the pressure plate 82 may be forced against the seal ring extension 52 so as to compress the latter and thereby pressurize the fluid within the ring as aforedescribed. Plate 82, and, therefore, screw 84, will be retained against rotation with the adjusting sleeve 90 by abutment of the edge of the plate with the wall of the recess 38'.

It will be observed that in each form of compression means, the tube 44 of the seal ring is not distorted so as to give rise to the aforementioned increased pressure areas of the seal ring with the pipes as in prior couplings of this nature. Moreover, the thrust exerted on the seal ring extension 52 to compress the same is exerted axially, rather than radially, of the ring so that the thrust will produce no lateral shafting of the ring out of concentricity with the coupling sleeves which would tend to increase the sealing pressure of the ring against the pipe on the side thereof adjacent the compression means.

If desired, the seal ring 42 in lieu of being made as a solid annular member may be split at one portion of the tube 44 to enable the seal ring to be laterally positioned about the pipes rather than being moved axially thereover from one end as might be necessary in certain installations wherein the pipe sections 58 and 58' were rigidly restrained in alinement so as to prevent separation thereof. In such a case, of course, the tube would be sealed at opposite sides of the split therein so as to preclude the leakage of the fluid from the tube.

While certain preferred embodiments of the present invention have been described and illustrated, it will be apparent that numerous modifications in design and arrangement of parts is possible within the scope of the following claims.

I claim:

1. In a fluid-tight coupling, a sealed, hollow seal ring of flexible material including a reservoir projecting from the ring proper, said reservoir having flexible walls defining a chamber communicating with the interior of the ring proper; fluid filling said interior and chamber; means for collapsing the walls of the reservoir whereby to pressurize the fluid in said interior including pressure means engaging a wall of the reservoir externally thereof and movable to collapse and release the reservoir, and means for moving said pressure means.

2. The subject matter of claim 1 wherein said reservoir comprises a hollow lateral extension formed on said ring.

3. The subject matter of claim 1 wherein the thrust exerted by said pressure means on the reservoir acts in a direction paralleling the axis of the ring.

4. The subject matter of claim 3 wherein said pressure means comprises a rotatable eccentric disk, and means for retaining the disk in a selected angular position.

5. The subject matter of claim 1 wherein said pressure means comprises a clamp screw, the axis of said screw paralleling the axis of the ring.

6. A fluid-tight pipe coupling comprising: a coupling sleeve formed with an internal annular groove and a recess communicating with the groove; a sealed, hollow seal ring of flexible material in said groove and formed with an extending reservoir having flexible walls defining a chamber communicating with the interior of the ring proper; said reservoir being disposed in said recess; said interior and chamber being filled with a liquid; pressure means movably carried on said sleeve for collapsing the walls of the reservoir whereby to pressurize the liquid in said interior and cause radially inward contraction of the ring; and means accessible exterior of the sleeve for moving said pressure means to collapse and release the reservoir.

7. The subject matter of claim 6 wherein said pressure means comprises an eccentric disk rotatably mounted on the sleeve, and means for retaining the disk in a given angular position.

8. The subject matter of claim 6 wherein said pressure means comprises a clamping screw threaded in said sleeve and including a pressure plate engaging a wall of the reservoir.

9. A seal ring comprising: a sealed, hollow tube of flexible material formed into an annular configuration and including a hollow reservoir extending from the ring proper, said reservoir having flexible walls defining a chamber of substantial volume communicating with the interior of the ring proper; and fluid filling said interior and chamber; the flexible walls defining the chamber being adapted to be collapsed to force fluid from the chamber into the ring proper.

10. The subject matter of claim 9 wherein said reservoir extends radially from the ring proper in the plane thereof and the walls of the chamber are relatively flat.

References Cited in the file of this patent

UNITED STATES PATENTS

| | | |
|---|---|---|
| 393,684 | Berryhill | Nov. 27, 1888 |
| 1,966,202 | Pfefferle | July 10, 1934 |
| 2,471,658 | Shaffer et al. | May 31, 1949 |
| 2,648,554 | Gilbert | Aug. 11, 1953 |

FOREIGN PATENTS

| | | |
|---|---|---|
| 829,509 | Germany | Jan. 28, 1952 |